Aug. 4, 1959  L. N. DAVIS ET AL  2,898,123
FRAME CONSTRUCTION FOR A NESTING SHOPPING CART
Filed Oct. 25, 1957  2 Sheets-Sheet 1

INVENTORS,
LYNN N. DAVIS,
WALTER H. SCHRAY
BY
Woodhams, Blanchard and Flynn
ATTORNEYS

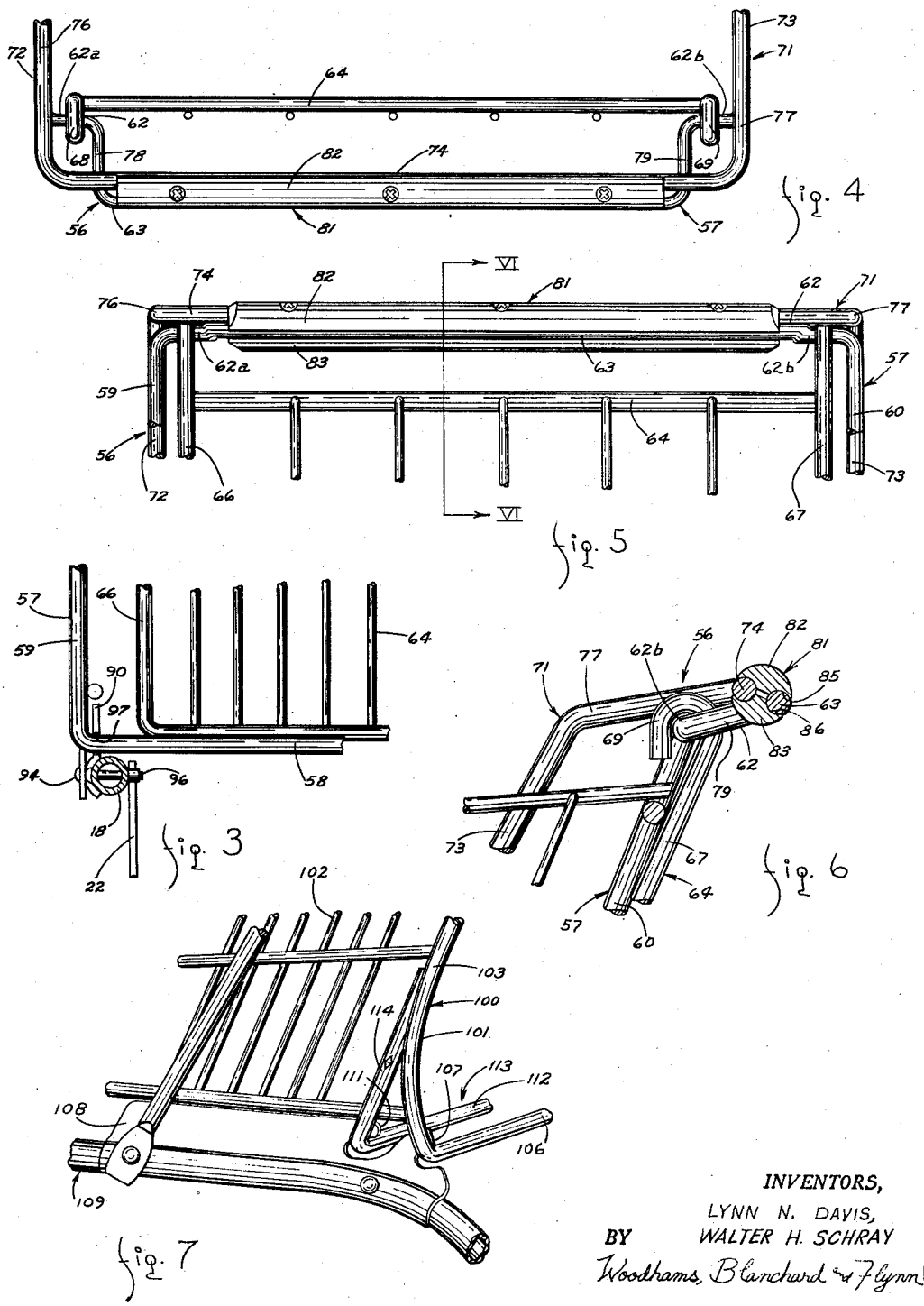

United States Patent Office 2,898,123
Patented Aug. 4, 1959

2,898,123

FRAME CONSTRUCTION FOR A NESTING SHOPPING CART

Lynn N. Davis, Calhoun County, and Walter H. Schray, Battle Creek, Mich., assignors to United Steel & Wire Company, Battle Creek, Mich., a corporation of Michigan Application October 25, 1957, Serial No. 692,445

9 Claims. (Cl. 280—33.99)

This invention relates to a shopping carrier construction and it relates particularly to frame construction in a nesting type of shopping carrier which is both economical to build and sturdy in operation.

In the design of shopping carriers of the nesting type, whose use in super markets has long been familiar, it is well understood that such carriers are subjected to rough handling by a large number of different people and, particularly, they are often loaded very heavily, which loading may place unexpected and often unreasonable strains on the carrier structure. Further, in the interest of creating confidence and good will on the part of the shopper, as well as encouraging the shopper to purchase as many articles as possible, it is highly undesirable for the carrier to show any reaction to overloading or in any way to give the impression to the shopper that it is weak or flimsy. On the other hand, since these carts are made in extremely large numbers, it is highly essential that the strengthening thereof is brought about by means which do not add appreciably, if at all, to their manufacturing cost. Still further, since the carriers are an integral part of a super market operation wherein the manner of display and the appearance of the merchandise, as well as of the entire store and its fixtures, is subjected to a great deal of study and is a source of a great deal of expense, it is highly desirable that the shopping carrier also present an attractive and well-styled appearance. Nevertheless, this appearance must be obtainable without sacrificing strength and without increasing cost.

Accordingly, the principal object of the invention is to provide a shopping carrier construction which will materially increase the strength and durability of the carrier over previously known carriers of similar nature and will also materially improve the appearance thereof but without appreciably adding to the cost thereof.

A further object of the invention is to provide a shopping carrier as aforesaid in which the article holding basket is supported solidly and durably directly on frame structure which in turn is supported on suitable wheels, usually casters.

A further object of the invention is to provide a shopping carrier as aforesaid in which only a minimum number of parts are required to provide a frame on which the article holding basket is supported.

A further object of the invention is to provide a shopping carrier as aforesaid in which a major portion of the basket supporting structure is provided by a single piece of suitably bent tubing.

A further object of the invention is to provide a shopping carrier as aforesaid in which the parts can be conveniently put together in suitable subassemblies and the subassemblies then in turn assembled with each other rapidly and conveniently.

A further object of the invention is to provide a shopping carrier as aforesaid in which the loads from the article supporting basket are distributed sufficiently onto the basket supporting frame to minimize the likelihood of an undesirable concentration of load at any one point.

A further object of the invention is to provide a shopping carrier as aforesaid in which the construction for the handle by which a shopper manipulates the shopping carrier is of simple, convenient and inexpensive construction and of a construction which is attractive in appearance.

Other objects and purposes of the invention will be apparent to persons acquainted with equipment of this general type upon a reading of the following disclosure and an inspection of the accompanying drawings.

In the drawings:

Figure 3 is a sectional view substantially as taken along III—III of Figure 1.

Figure 4 is a fragmentary top plan view of the handle portion of the carrier shown in Figure 1.

Figure 5 is a fragmentary elevational view of the handle structure shown in Figure 4.

Figure 6 is a sectional view taken along the line VI—VI of Figure 5.

Figure 7 is a fragment of Figure 1 showing an alternate structure for supporting the basket upon the base structure.

Figures 1, 2:
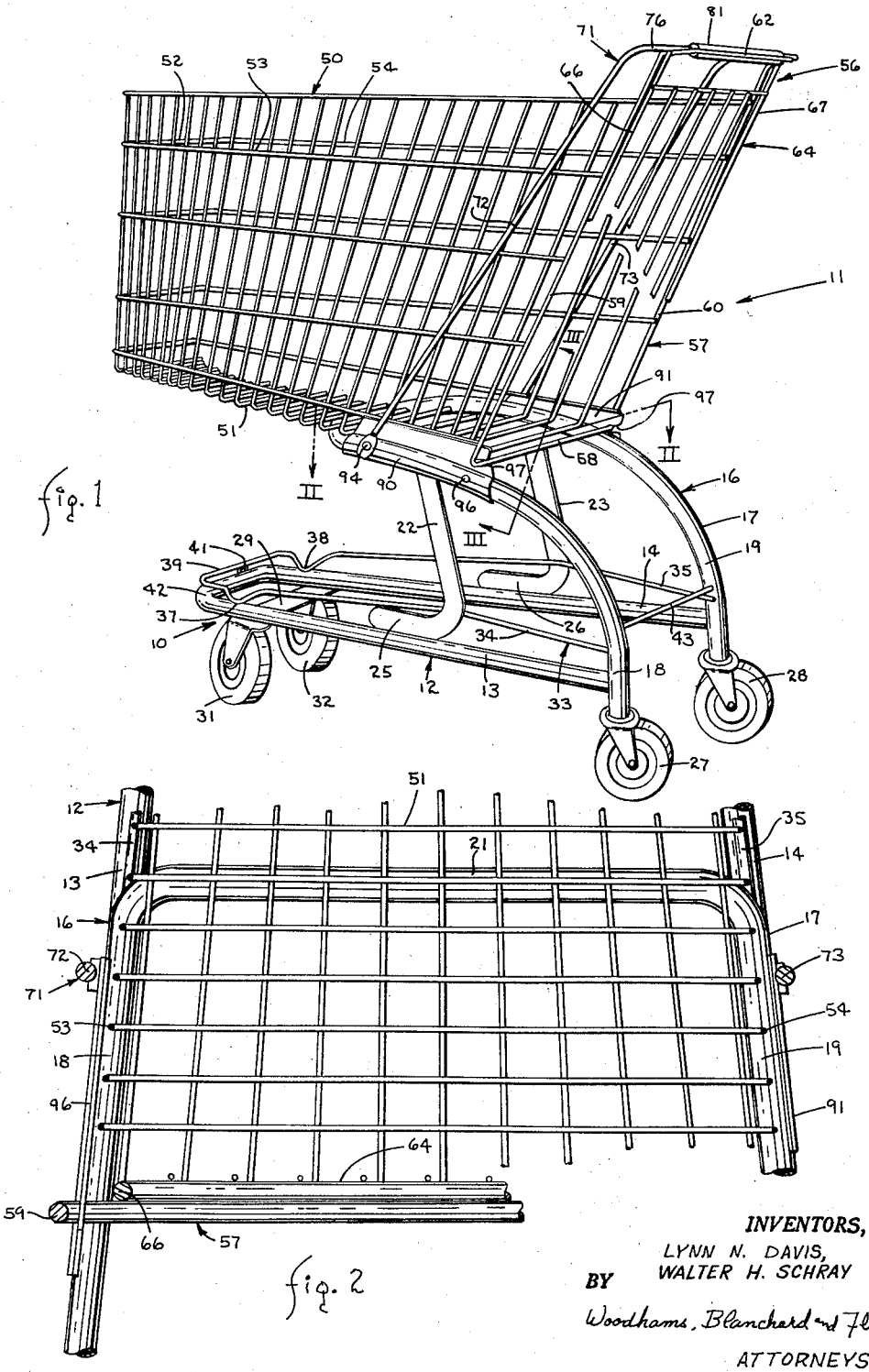
Figure 1 is an oblique view of a package carrier embodying the invention.
Figure 2 is a sectional view substantially as taken along II—II of Figure 1.

For the purpose of convenience in the description and with no limiting significance, the terms "upper," "lower" and derivatives thereof will have reference to a shopping carrier embodying the invention in its normal position of use as appearing in Figure 1. The terms "front," "rear" and derivatives thereof will have reference to the normal direction of movement of the shopping carrier shown in Figure 1, the front end being the leftward end as appearing in Figure 1. The terms "inner," "outer" and derivatives thereof will have reference to the geometric center of said shopping carrier and parts thereof.

General description

In general, a shopping carrier embodying the invention utilizes a single piece of bent tubing formed into a generally U-shaped structure having sides slightly converging from the rearward end of the shopping carrier forward and having the two forward wheels of the carrier at the bight of the U and having the two rearward casters at the extremities of the U. A second piece of bent tubing has its free ends fixed to the free ends of the first U-shaped member and extends upwardly and forwardly so that the bight of the second U and the portion of the legs immediately adjacent thereto lie in a substantially horizontal plane. Generally L-shaped supports extend from the region adjacent the bight of the second U-shaped member down to the legs of the first U-shaped member. An article supporting basket is fastened rigidly to the horizontal portion of the second U.

The handle structure comprises a pair of rod-like means which extend rearwardly from the upward and rearward part of the article containing basket, are bent across each other to improve their rigidity and strength and are arranged to provide a pair of spaced parallel members which are embraced by the two parts of a longitudinally split handle.

The illustration and description herein of only the simpler forms of shopping carriers does not preclude the use with the parts shown herein with other items normally used for such carriers, such as a baby seat which may be utilized with the rear panel of the carrier in the manner illustrated by application Serial No. 682,653, filed September 9, 1957, assigned to the same assignee as the present application.

Detailed construction

As shown in Figure 1, the chassis 10 of the shopping carrier 11 has a substantially U-shaped frame member 12, the legs 13 and 14 of which are substantially horizontal and diverge rearwardly. The basket mount 16 includes a U-shaped support member 17, the legs 18 and 19 of which are secured near their free ends, respectively, to the free ends of the legs 13 and 14 of the U-shaped frame member 12. Said legs 18 and 19 then curve upwardly and forwardly where they are integral with the opposite ends of the bight 21 of said U-shaped support member 17. A pair of braces 22 and 23 extend between the respective legs of the frame 12 and support member 17 near the bight 21. In this particular embodiment, the braces 22 and 23 are L-shaped so that the horizontal arms 25 and 26 thereof can extend on and along the corresponding legs 13 and 14, respectively, of the frame member 12 in order to distribute the weight thereon and avoid concentrating it at a single point on said respective legs 13 and 14. This arrangement reduces the possibility of a collapse in the legs 13 and 14 when an excessive weight is imposed upon the braces 22 and 23.

A pair of casters 27 and 28, which may be fixed or swiveled, are secured to the free ends of the legs 18 and 19 of the support member 17 for supporting the rearward end of the chassis 10. A support plate 29 is secured, as by welding, to the front end of the U-shaped member 12 and a pair of front swivel casters 31 and 32 are mounted upon said support plate 29 for supporting the front end of the chassis 10. A U-shaped brace rod 33 is secured, as by welding, at its free ends to the legs 18 and 19 of the support member 17 near the frame member 12 and overlies the frame 12 in spaced relationship upwardly therefrom. The legs 34 and 35 of said brace rod are secured in any convenient manner, as by welding, between their ends to the braces 22 and 23 and are provided with downwardly offset portions 37 and 38 near the bight 39 of said brace rod for securement, as by welding, to the legs 13 and 14. Accordingly, the legs 34 and 35 provide a truss structure which strengthens the chassis 10. The bight 39 of the brace rod 33 is connected to the bight 42 of the frame member 12 by a plurality of connecting elements 41 which extend between and are secured, as by welding, to the bight 39 of the brace rod 33 and the bight 42 of the U-shaped member 12. A cross-member 43 extends between and is secured, as by welding, to the legs 18 and 19 of the support member 17 above the level of the brace rod 33 so as not to interfere with the nesting characteristics of the chassis 10. Likewise, the L-shaped brace members 22 and 23 are arranged with their horizontal arms 25 and 26 extending forwardly to provide a minimum of obstruction to the nesting function of the shopping carrier 11. Where maximum nesting is desired the cross-member 43 may be omitted.

The package basket 50 is fabricated substantially completely from metal rods which are welded together. Said basket has a bottom wall 51, a front end wall 52 and a pair of side walls 53 and 54 which are substantially integral by virtue of the fact that the rods forming such walls extend from one wall to at least one other adjacent wall. The handle structure 56 of the shopping carrier 11, which also serves to hold the basket 50 upon the basket mount 16, includes a substantially rigid rectangular support frame 57 having a bottom element 58 secured to the rearward edge of the bottom wall 51 and a pair of side elements 59 and 60 also secured, as by welding, to the side walls 53 and 54, respectively. The upper element 62 which is spaced above the upper edge of the basket 50 has a central portion 63 which is offset rearwardly. The rear panel 64 of the basket 50 has a pair of rigid side elements 66 and 67 which terminate in hooks 68 and 69 for pivotally engaging the upper element 62 of the support frame 57 at the coaxial segments 62a and 62b located on opposite sides of the offset portion 63. The rear panel 64 is of such length that the lower edge thereof engages the bottom elements 58 of the support frame 57 thereby preventing the lower end of said rear panel 64 from swinging through the open rearward end of the basket 50. However, the rear panel 64 is free to pivot forwardly and upwardly about the upper element 62 to receive the forward end of a basket 50 on another similar shopping carrier 11 during the nesting operation.

A substantially U-shaped brace member 71 is provided with legs 72 and 73 and a bight 74. The legs 72 and 73 are secured, as by welding, to the side walls 53 and 54, respectively, of the basket 50 near the rearward end thereof so that their lower end portions extend slightly below the bottom wall 51 of said basket, and are spaced forwardly from the bottom element 58 of the support frame 57. Said legs 72 and 73 extend substantially above the upper edge of the package basket 50 where they are both bent rearwardly so that the bight 74 is close to the upper element 62 of the support frame 57. The bent upper portions 76 and 77 cross over the upper element 62 on opposite sides of the offset portion 63 thereof as shown in Figure 4. The bight 74 of said brace member 71 then crosses over and is welded to each of the end members 78 and 79 of the offset portion 63.

The bight 74 is securely connected to the upper element 62 by a handle grip 81. The handle grip 81 is comprised of two substantially identical elongated semi-cylindrical members 82 and 83 having grooves 85 and 86 therein to receive the offset portion 63 and the bight 74. The handle parts are fastened together by any suitable means, such as rivets.

Mounting brackets 90 and 91 are secured to the respective legs 18 and 19 by rivets 96, and extend upwardly therefrom. The mounting brackets 90 and 91 have rearwardly opening hooks 97 which engage and prevent movement of the bottom element 58 on the support frame 57 when the legs 72 and 73 are secured by the rivets 94. Accordingly, when the basket 50 is assembled upon the basket mount 16, the brackets 90 and 91 are first secured to the support member 17 by means of the rivets 96 after which the bottom element 58 is engaged by the hooks 97 and the brace member 71 is secured with respect to the basket mount 16 by the rivets 94. Thus, it will be seen that the basket 50 rests upon the basket mount 16 and is secured to the handle structure 56. Said handle structure is in turn secured to the basket mount 16.

The shopping carrier 11 is operated by manually grasping the handle grip 81 and thereby directing the said carriage in any direction desired in view of the support thereof upon suitable castered wheels. When it becomes desirable to store a group of shopping carriers between periods of use, one such carrier is moved forwardly to the rear of another similar carrier whereby the rear panel 64 is pivoted upwardly, thereby permitting the basket 50 of the rearward carrier to be nested within the basket of the forward carrier in a known manner. At the same time, the chassis 10 of the rearward carrier is received into the chassis of the forward carrier. When it becomes desired to use one of the carriers, the rearward one is simply backed away from the frontward carrier thereby permitting the rear panel 64 to drop back into its closed position where its lower edge engages the bottom element 58 of the support frame 57.

Alternate structures

A modified handle structure 100, shown in Figure 7, provides a support frame 101 at the rearward end of the basket 102 wherein the side elements, one of which is indicated at 103, are curved away from the basket 104 near the lower end thereof. The lower element 106, which is thereby spaced from the bottom wall of the basket, engages a secondary hook 107 on each mounting bracket 108. The primary hook 111 on each mounting bracket 108 is engaged by the bight 112 of a U-shaped auxiliary frame member 113, having legs 114 which are secured, as by welding, to the side elements 103, above the curved lower portions thereof.

Thus, the modified handle structure serves not only to stream-line the appearance and structure of the associated shopping carrier, but also provides additional securement of said handle structure with respect to the chassis of which said basket mount 109 is a part and permits somewhat lighter metal to be used for the mounting brackets 108 than is possible in the form of the invention shown in Figures 1 to 6.

Although particular preferred embodiments of the invention have been disclosed above for illustrative purposes, it will be understood that variations or modifications of such disclosure, which lie within the scope of the appended claims, are fully contemplated.

We claim:

1. In a shopping carrier having a wheel supported base platform, a basket supporting base structure extending upwardly from and supported on said base platform and an article containing basket rigidly connected to said basket-supporting base structure, the improvement comprising: a pair of coaxial, generally horizontal, rod segments rigidly supported above the rearward end of said basket and a rear panel pivotally supported on said segments for normally closing the rearward end of said basket, a first handle element comprising a generally U-shaped element having its free ends affixed to said segments and its bight spaced from and generally parallel with the common axis of said segments; a second handle element comprising a second U-shaped element having its free ends parallel and affixed to the sides of said basket and having a portion adjacent its bight extending in a generally horizontal direction across said segments, the bight of said second handle element being wider than the bight of said first handle element and extending substantially parallel to the bight of said first handle element and spaced forwardly therefrom so that said bight of said second handle element crosses and is supported on and by the legs of said first handle element; and a two-piece handle embracing both of said parallel bights and filling the space therebetween.

2. The device defined in claim 1 wherein the free ends of said second handle member are affixed to the forward end of said basket supporting base structure and said segments are each portions of a rod which extends downwardly along the rearward end of said basket; means on said basket-supporting base structure defining hooks, said rod being interconnected with said hooks.

3. In a shopping carrier construction, the combination comprising: a generally horizontal base platform; ground-engaging wheels supporting said base platform adjacent the forward and rearward ends thereof; a substantially U-shaped basket supporting member, said U-shaped member being secured adjacent the free ends of the legs thereof to said base platform adjacent the rearward end thereof, the legs of said U-shaped member extending upwardly and forwardly from the rearward end of said base platform, the bight of said U-shaped member and the portions of the legs adjacent thereto being substantially parallel with and positioned directly above said base platform; reinforcing elements secured to and extending downwardly from said U-shaped member near the bight thereof, said reinforcing elements being secured at their lower ends to said base platform; a substantially horizontal basket positioned adjacent to and above said bight and the portions of the legs of said U-shaped member adjacent thereto; means affixing said basket to said U-shaped member; and handle means affixed rigidly with respect to said basket and positioned above said U-shaped member and said base platform adjacent the rearward end thereof.

4. The device defined in claim 3 including a mounting bracket affixed to and extending upwardly from the portion of each of said legs adjacent to the bight of said U-shaped member, each of said brackets having a hook thereon spaced from the bight of said U-shaped member; means on said basket at a point spaced from its point of support on said bight for engaging said hooks and rigidly holding said basket from movement with respect to said U-shaped member.

5. The device defined in claim 3 including a generally U-shaped rod spaced upwardly from and arranged to overlie the periphery of said base platform, and means affixing the free ends of said U-shaped rod to the legs of said U-shaped member adjacent the free ends thereof; and means connecting the portion of said U-shaped rod adjacent the bight thereof to the forward portion of said base platform.

6. The device defined in claim 4 including an elongated member on the lower edge of said basket and extending transversely between the legs of said U-shaped member, and said elongated member being in engagement with said hooks.

7. In a nesting-type shopping carrier construction, the combination comprising: a generally horizontal base platform; ground-engaging wheels supporting said base platform adjacent the forward and rearward ends thereof, said base platform converging in a forward direction; a substantially U-shaped basket supporting member secured adjacent the free ends of the legs thereof to said base platform adjacent the rearward end thereof, the legs of said U-shaped member extending upwardly from the rearward end of said base platform and then being bent to extend forwardly from said rearward end, the bight of said U-shaped member and the portions of the legs adjacent thereto being substantially parallel with and positioned directly above said base platform, the bight of said U-shaped member being located between the forward and rearward ends of said base platform; reinforcing elements secured to and extending downwardly from said U-shaped member near the bight thereof, said reinforcing elements being secured at their lower ends to said base platform; a substantially horizontal, forwardly converging basket positioned above said bight and the portions of the legs of said U-shaped member adjacent thereto, said basket having an open top and having means defining a bottom wall resting on said bight; means affixing said basket to said U-shaped member; and handle means affixed to said basket at the rearward end thereof and positioned above said U-shaped member and said base platform adjacent the rearward end thereof.

8. In a nesting-type shopping carrier construction, the combination comprising: a generally horizontal base platform; ground-engaging wheels supporting said platform adjacent the forward and rearward ends thereof; a substantially U-shaped basket-support member secured adjacent the free ends of the legs thereof to said base platform adjacent the rearward end thereof, said legs of said basket-support member extending upwardly and being curved forwardly so that the bight of said basket-support member and the portion of the legs thereof adjacent said bight are substantially parallel with and positioned directly above said base platform, the bight of said basket-support member being located between the forward and rearward ends of said base platform; a pair of reinforcing elements, said elements being secured, respectively, to the respective legs of said basket-support member and extending downwardly therefrom and being secured at their lower ends to said base platform; a substantially horizontal basket positioned adjacent to and above said bight and the portions of the legs of said basket-support member adjacent thereto, said basket having a rigid frame member defining the periphery of the rear wall thereof and means securing said frame member to said legs of said basket-support member; a rod secured to each of the side walls of said basket and extending downwardly and forwardly thereon and means for securing said rods, respectively, to the respective legs of said basket-support member adjacent the bight thereof; a handle affixed to said basket at the rearward end thereof and positioned above said basket-support member and said base platform adjacent the rearward end thereof, said rods and said frame member being affixed to said handle.

9. In a nesting-type shopping carrier construction, the combination comprising: a generally horizontal base platform including a U-shaped frame member whose legs diverge in a rearward direction; a pair of ground-engaging wheels and means secured to said U-shaped frame member adjacent the bight thereof for supporting said wheels adjacent the respective legs thereof; a U-shaped basket-support member, said U-shaped basket-support member having its legs secured to and extending transverse of the free ends of the legs of said frame member; a pair of ground-engaging wheels secured to the free ends of said legs of said basket-support member, said legs of said basket-support member extending upwardly and being curved forwardly so that the bight of said basket-support member and the portion of the legs thereof adjacent said bight are substantially parallel with and positioned directly above said base platform, the bight of said basket-support member being located between the forward and rearward ends of said base platform; a pair of reinforcing elements, said elements being secured, respectively, to the respective legs of said basket-support member and extending downwardly therefrom and being secured at their lower ends to the respective legs of said frame member; a substantially horizontal, forwardly converging basket positioned adjacent to and above said bight of said basket-support member and the portions of the legs thereof adjacent to said bight, said basket having an open top and having means defining a bottom wall resting on said bight; and handle means affixed to said basket at the rearward end thereof and positioned above said basket-support member and said base platform adjacent the rearward end thereof.

References Cited in the file of this patent

UNITED STATES PATENTS

| | | |
|---|---|---|
| 2,432,489 | Schultheis | Dec. 9, 1947 |
| 2,508,670 | Goldman | May 23, 1950 |
| 2,556,532 | Goldman | June 12, 1951 |
| 2,615,726 | Brottman | Oct. 28, 1952 |
| 2,689,133 | Goldman | Sept. 14, 1954 |
| 2,764,419 | Enders | Sept. 25, 1956 |